Patented June 26, 1928.

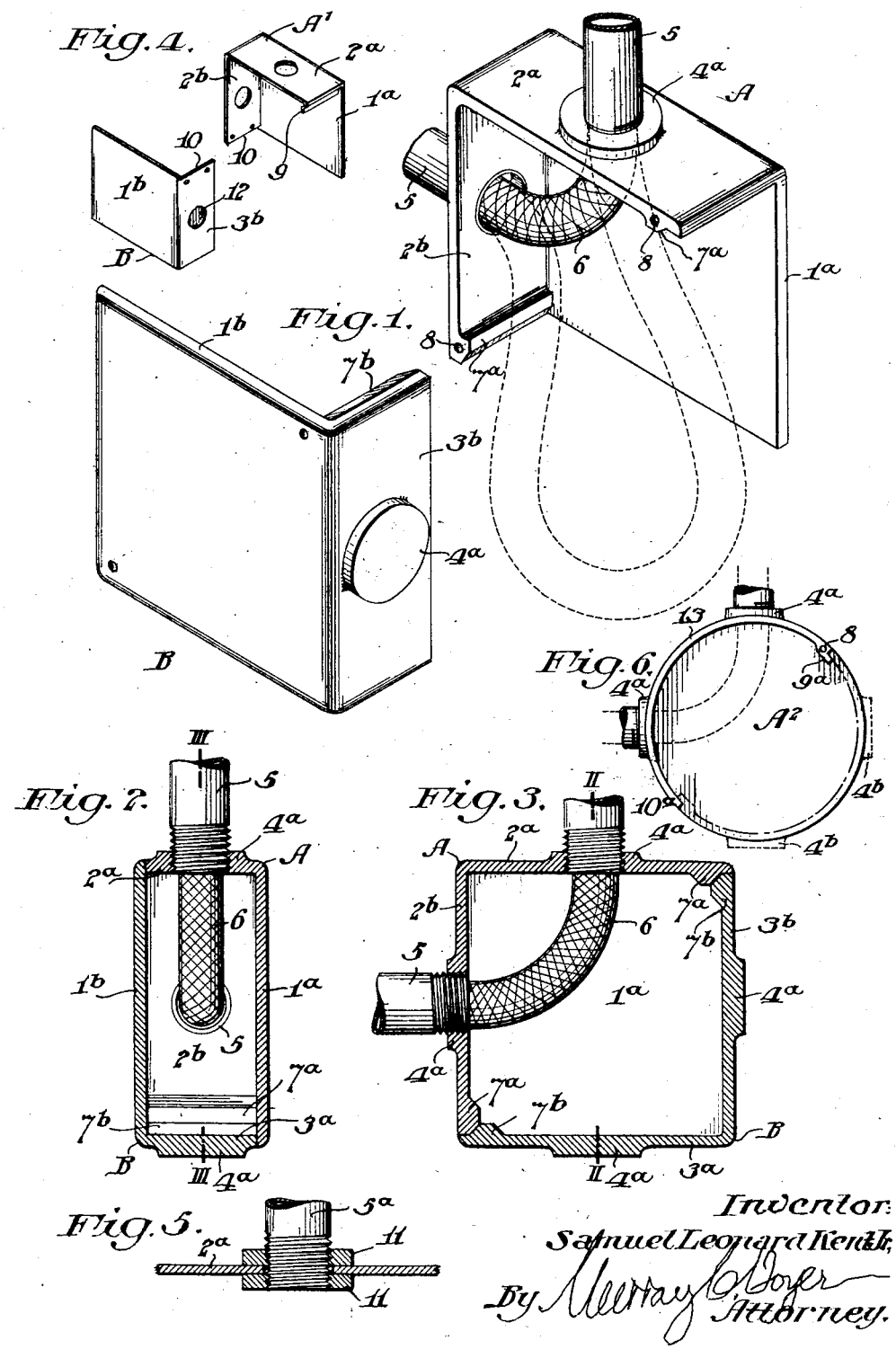

1,675,219

UNITED STATES PATENT OFFICE.

SAMUEL LEONARD KENT, JR., OF LANSDOWNE, PENNSYLVANIA.

JUNCTION BOX.

Application filed December 31, 1923. Serial No. 683,590.

My invention relates to structures employed in the wiring of buildings; more particularly structures employed with heavy cables carrying a multiplicity of wires, and it comprises certain improvements in casing structures familiarly known as "junction boxes," in which connections may be made with individual conductors of the heavier cables, and also for protecting angular bends in such cables, usually right angled bends, forming part of the wiring installation.

As is well known, all heavy cables of electrical installations are encased in protective members, usually metal pipes, and it is quite difficult when running such cables through a building to pull the same, except in straight lines, through said pipes. It is, in fact, almost if not quite impossible to pull cables of any size around a right angled bend.

The greater number of boxes or cases of this type are made up of sided shells, frequently rectangular and therefore having four sides, with an attached bottom and a removable top. In usual practice it is a relatively simple matter to pull the smaller cables through one side of such form of box and pass them out another side. When handling heavy cables, however, the space provided by a box of this type is insufficient to permit the cable to be pulled in in one direction and then passed out at a right or other angle to the first line of draft when passing a right or other angled bend.

One object of my invention is to provide a junction box which may be used in large or small sizes that will materially facilitate draft of the cable in straight lines whereby it may be drawn through the box in one direction and then delivered from the box in another direction.

A further object of my invention is to provide a box of the character described made up of two elements, each element comprising a bottom or top wall, and side wall attached thereto; such sections being usually identical in shape and size and exactly complemental to each other so that when placed together in the relative proper position, they will form a box or casing with top and bottom walls and enclosing side walls. If rectangular, each section will have two walls and the completed structure will have four side walls.

A further object of my invention is to provide a structure of this type that may be constructed of cast or pressed metal, ready for assembly in a simple manner.

These and other features of my invention are more fully described hereinafter; reference being had to the acompanying drawings, in which:

Figure 1, is a perspective view illustrating one form of junction box made in accordance with my invention, showing the same in a position of use, with one section displaced and in relative position with respect to a fixed section to which tubular members receiving the cable are attached.

Fig. 2, is a cross sectional view of the structure shown in Fig. 1, on the line II—II, Fig. 3.

Fig. 3, is a sectional elevation on the line III—III, Fig. 2.

Fig. 4, is a perspective view of the detached parts of a modified structure designed to be made of sheet metal, within the scope of my invention.

Fig. 5, is a sectional view illustrating a detail of the structure shown in Fig. 4, and Fig. 6, is a view in elevation of another form of junction box within the scope of my invention.

In the form of my improved structure shown in Figs. 1, 2 and 3, the junction box is made up of sections A and B, and each of these sections comprises a top or bottom web $1^a$ (or $1^b$), with a pair of side walls indicated at $2^a$ (or $2^b$), and $3^a$ (or $3^b$), which side walls may be and preferably are integral with the bottom or top web $1^a$ (or $1^b$). The sections A and B of my improved structure may be made of cast metal or pressed metal, as may be desired.

Each of the side walls of each section of the structure illustrated in Figs. 1, 2 and 3, is provided with a boss $4^a$ (or $4^b$), providing sufficient metal which may be tapped and threaded for the reception of the tubular cable carrying members, indicated at 5, and through which a cable, indicated at 6, is passed. If desired, all of the bosses of each section may be tapped and threaded, and the apertures of the unused bosses closed by means of suitable plugs.

In Fig. 1, the structure is illustrated in a position of use, and in this particular instance, one of the pipes 5, is shown as connected to the wall $2^a$ of the section A of the junction box, while the other pipe is shown as connected to the wall $2^b$ of such section, so that the cable 6 may be drawn into the box, in either direction, and then passed into and through the other pipe.

One or both walls may be ribbed as indicated at $7^a$ (or $7^b$), and in the cast form of structure these ribs will be tapered in order that the patterns may be withdrawn from the molds. The wall is extended beyond one of the ribs of each section to form a seat which receives the end of the meeting wall of the complemental section. When placed together, these ribs abut, as clearly indicated in Fig. 3. The sections may be held together by screws passing through one top (or bottom) web into apertures or recesses 8 formed in the other section, or the latter may have threaded studs to pass through openings in the top (or bottom) web and have nuts applied to the exposed ends.

By reason of the fact that the box is entirely open opposite these pipe connections, it is a very simple matter to pull the cable into and through the same, and in Fig. 1, I have illustrated by dotted lines a portion of the cable that has been pulled through one of the pipe connections preliminary to passing it through the other pipe connection; showing the ease in which the cable so drawn through may be handled.

The box may be held in position by any suitable means and it is obvious, of course, that it can be partially or fully built into a concrete wall or floor as may be desired.

In Fig. 4, I have shown a structure of the same type as that illustrated in Figs. 1, 2 and 3, except that it is made of pressed metal. In order that the sections A′ and B′ may be secured together, one of the side walls of each section may be provided with a recessed flange 9, forming a seat to receive the end 10 of the other wall of the adjacent and complemental section. The side walls of the sections A′ and B′ are apertured for the reception of the pipes $5^a$ to receive the cables and these pipes may be securely held to the walls of said sections by nuts 11, as shown in Fig. 5. The apertures not used may be covered by partially displaced wall sections 12, which may be removed when a connection is to be made with such form of structure.

In the forms of structure illustrated in Figs. 1, 2, 3 and 4, each of the sections provides a pair of walls at right angles to each other, which may receive the tubular cable-receiving elements, with a supporting web or wall adapted to maintain said side walls in proper angular position and without obstruction opposite the same; the complemental member to complete the box or casing being of similar size, shape and construction.

It will be understood that a structure comprising complemental sections, substantially circular in one plane, may be provided to form a junction-box within the scope of my invention, such sections in each instance comprising a disk-like member $A^2$ (or $B^2$), with an arched wall 13, semicircular in contour, attached thereto or formed integral therewith as shown in Fig. 6. If of cast metal the sections may be provided with the bosses $4^a$ (or $4^b$) to be subsequently tapped and receive the cable carrying conduits. Each section will be provided with a flange $9^a$ at one end of the arched wall portion to receive the end $10^a$ of the wall portion of the opposite section.

While I have described a structure formed of two complemental members, each made of cast or pressed metal with integral parts, and so shaped that when applied together they will form a complete box or casing, it is obvious that my improved structure may be made up of individual top and bottom sections and side wall sections suitably connected together, and in which adjoining pairs of side wall sections may be secured by suitable means to a top or bottom section, and that such built-up members may be exactly complemental to each other and designed to be applied together to form the complete junction box structure in the manner above described, without departing from my invention.

I claim:

1. A junction-box consisting of a pair of members, each comprising a side web of the full dimensions of the complete box and a pair of webs at right angles thereto and to each other; each of said webs constituting a complete wall of said box and said triple-walled members being adapted when applied together to form a complete enclosing casing, and means detachably securing said triple-walled members together.

2. A junction-box consisting of a pair of members, each comprising a side web of the full dimensions of the complete box and a pair of webs at right angles to each other; each of said webs constituting a complete wall of said box and said triple-walled members being adapted when applied together to form a complete enclosing casing substantially rectangular in shape, and means detachably connecting said triple-walled members.

3. A junction-box comprising a pair of members, each of similar size and shape, and of complemental construction; each member having three sides constituting complete walls of said box and adapted when applied together to form a complete casing substantially rectangular in shape, and means detachably securing said triple-walled members together.

4. A junction-box comprising complemental members of similar size and shape, each of said members having three sides constituting complete walls integrally connected together and lying in different planes; said triple-walled members being adapted when applied in proper position with relation to each other to form a complete enclosing casing rectangular in shape, with means detachably securing said members together.

5. A junction-box consisting of a pair of members, of similar size and shape, and of complemental construction, each member comprising a side web of the full dimensions of the box and a pair of webs constituting complete walls at right angles to said side web and integral therewith; said triple-walled members being adapted when applied together to form a complete enclosing casing, and means for detachably securing said triple-walled members together.

6. A junction-box consisting of a pair of sections of similar size and shape, and of complemental construction; each section having three sides constituting complete walls of the finished box disposed at right angles to each other and in different planes and adapted when applied together to form a complete enclosing casing rectangular in shape; said triple-walled sections being integral, a seat formed in the wall of one of said sections for the end of the meeting wall of the complemental section, and means for securing said sections together.

7. A junction-box consisting of a pair of sections; each section comprising a side of the full dimensions of the box and a pair of complete walls at right angles to said side and integral therewith; said walls having bosses adapted to be apertured and having ribs adjacent the ends thereof, said sections being complemental to each other and forming when assembled a complete enclosure with the ribs of meeting walls abutting, and means for detachably securing said sections together.

8. A junction-box consisting of a pair of sections each with a side of the full dimensions of the finished box and a pair of walls at right angles to said side and integral therewith; said walls having ribs extending thereacross and said sections being complemental to each other and forming when assembled a complete enclosure rectangular in shape and with the ribs of meeting walls abutting, and means for detachably securing said sections together.

In witness whereof I have signed this specification.

S. LEONARD KENT, Jr.